Patented Feb. 20, 1934

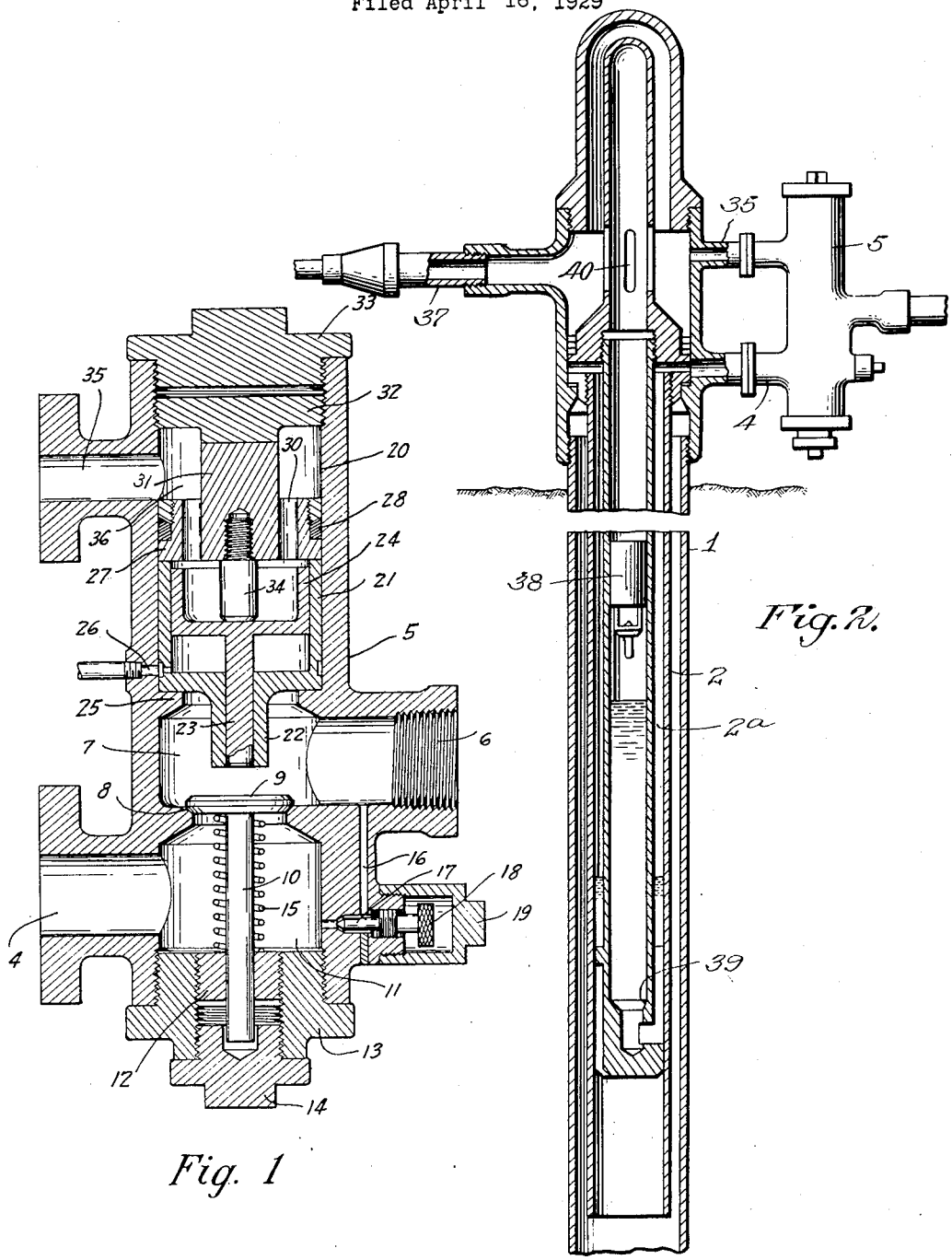

1,947,585

UNITED STATES PATENT OFFICE 1,947,585

FLUID PRESSURE REGULATOR

Harold W. Fletcher, Houston, Tex., assignor to Hughes Tool Company, Houston, Tex., a corporation of Texas Application April 16, 1929. Serial No. 355,598

6 Claims. (Cl. 103—52)

My invention relates to a device for automatically regulating the fluid pressure flowing into a well or other structure wherein a fluid lift is employed.

The device is an improvement upon the regulator shown and described in my prior copending application No. 326,234, filed December 15th, 1928, patented February 16, 1932, No. 1,846,002, and the object of this improvement is to simplify the structure of the device shown in the previous application so as to make the action of the regulator more reliable and positive.

It is also desired to so form the valve closing means that it will be actuated entirely by fluid pressure without the necessity of springs or diaphragms.

The main object is to provide a simple self contained pressure fluid regulator which may be cheaply constructed, but which will be reliable and positive in action.

In the drawing, Fig. 1 is a central longitudinal section through my improved regulator. Fig. 2 is a more reduced view of the regulator shown in elevation and attached to the well operating apparatus upon which it may be used said apparatus being shown in central vertical section.

It is to be understood that the regulator is capable of wide application, but I have shown the same as controlling the flow of pressure fluid, such as air, to a well from which the liquid is to be raised by the air pressure.

The well is equipped with an outer casing 1 and two inner concentric pipes 2 and 3. The pipe 3 is the eduction tube from which the liquid is pumped. The air finds entrance to the lower end of this tube through the space 2ª between pipes 2 and 3, which space connects with the inlet pipe 4. A plunger 38, is raised with its load of liquid by the fluid pressure below it and when this load is discharged the air pressure exhausts after it, allowing the plunger to drop back again for another stroke.

The pressure regulator controls the entrance of the air to the well. Referring to Fig. 1, the device is shown as formed with a casing or housing 5 of a generally cylindrical outline. The air for the well enters the housing 5 through an inlet opening 6 connected with the source of supply of air or gas under pressure, not shown. The inlet 6 opens into a valve chamber 7, the lower wall of which has a valve seat 8 therein to receive an upwardly opening valve 9.

The valve 9 is a disc shaped plate having a downwardly extending stem 10, which projects through a lower chamber 11 and has a bearing in a block 12. Said block is screwed within a tubular nut 13 closing the lower end of the housing. Below the block 12, the nut 13 is closed by a plug 14, said plug having a slight recess to receive the lower end of the stem 11. A spring 15 bearing between the valve 9 and the block 12 tends to force the valve 9 from its seat with a predetermined pressure which may be regulated by the position of the threaded block.

There is a by-pass for pressure fluid from the inlet 6 to the chamber 11, by way of a passage 16. A needle valve 17 in this passage is regulated by a thumb nut 18 enclosed for protection within a cap 19.

Above the chamber 7 is a cylinder 20 within which a piston 21 is adapted to slide. Said piston is cup shaped and its lower end is formed with a downwardly extending tubular boss 22, which serves as a guide for a stem 23, formed upon the lower end of a smaller piston 24 slidable within the cup of the piston 21. The cylinder has an inwardly extending flange 25 at its lower end, which serves to limit the downward movement of the piston 21. A vent is formed at 26 to allow escape of air from the space below the inner piston 24 when it moves downwardly and to allow entrance of air when it moves upwardly.

Above the piston 21, is a plate or block 27 which fits closely within the cylinder and forms a fluid tight seal therewith through the packing ring 28. Said plate has longitudinal openings therethrough as shown at 30. A stop member 31 on the plate extends upwardly a short distance and contacts with a cylinder head 32 screwed adjustably within the upper end of the cylinder. Above the head 32, a plug 33 acts to further close the upper end of the housing. The plate also has a downwardly extending pin 34 thereon which serves to limit the upward movement of the inner piston 24.

The upper end of the regulator is connected with the upper end of the well casing adjacent the outlet therefrom for the liquid. This connection is by way of a pipe 35 leading to the chamber 36 above the plate 27.

In the operation of this device, the air pressure from the inlet 6 gradually leaks past the valve 9 by way of the by-pass 16 and builds up in the space 2ª and below the plunger which is then seated on the seat 39. It will do this until a sufficient back pressure of liquid in the eduction tube has accumulated to bring the pressure of the air in the space 2ª and the chamber 11 to a value nearly equal to the line pressure above the valve 9. The spring 10 will then act to unseat the valve and allow the full line pressure to enter the well and raise the plunger and load of liquid to the surface and discharge the liquid from the openings 40 in the tube and the outlet 37 to storage. As the load is discharged, the air also exhausts following it and relieves the pressure in the well sufficiently to decrease the pressure below the valve 9. This allows the plunger to drop back to the bottom.

The pressure exerted by pressure fluid as it raises the liquid to the upper end of the casing 1, is exerted above the piston 24, and moves it downwardly, the stem 23 engaging the open valve 9, and forcing it to its seat against the pressure of the spring 10. When once seated, the line pressure through the inlet 6 will hold the valve seated as before until the well pressure again builds up. When the pressure has exhausted at the upper end of the well casing, following the discharge of the load, the air pressure below the stem 23 will act to force it back upwardly into the position shown in Fig. 1 with the piston making contact with the stop pin 34.

This regulator will be seen to operate in a manner similar to the operation of my prior device previously referred to, but the structures of the valve closing devices have been greatly simplified.

What I claim as new is:

1. In a device of the character described, a fluid regulator including a housing, a passage for pressure fluid through said housing, a valve opening upstream in said passage and adapted to be held in closed position by excess fluid pressure from upstream in said passage, means tending to open said valve, a cylinder above said valve, a flow connection between said fluid passage and said cylinder, and a fluid pressure operated piston in said cylinder to close said valve, operated by the pressure of fluid in said connection from the downstream side of said valve.

2. In a device of the character described, a fluid regulator including a housing, a passage for pressure fluid through said housing, a valve opening upstream in said passage, means tending to open said valve, a cylinder above said valve, a flow connection between said fluid passage and said cylinder, and a fluid pressure operated piston in said cylinder, a stem thereon spaced above and out of contact with said valve, and means through which pressure fluid may be applied to operate said piston to move said stem to close said valve actuated by the discharge of fluid into said cylinder from the downstream side of said valve.

3. A device of the character described including a regulator for pressure fluid, said regulator comprising a housing having a pressure fluid passage, a valve in said passage adapted to be held normally closed by said fluid, means tending to unseat said valve, and means operated through the pressure of the fluid that has passed said valve to close said valve, the upstream pressure on said valve tending to retain said valve in closed position.

4. A device of the character described including a regulator comprising a housing having a passage therethrough for said fluid, a valve in said passage adapted to be normally held closed by said fluid, means tending to unseat said valve, a fluid connection between said passage and the upper end of said housing, and means entirely separated from said valve including a piston and a stem thereon operated through the force of pressure fluid which has passed said valve to close said valve.

5. A fluid regulator including a housing having a fluid passage therethrough, an upwardly opening valve in said passage, an upper valve chamber and a lower valve chamber, means in said lower valve chamber tending to unseat said valve, said valve being held in its seat by fluid pressure on the upstream side thereof, a leak from the said upstream side to said lower valve chamber, a cylinder above said valve, a piston in said cylinder, means connecting the lower valve chamber with said cylinder and means on said piston to close said valve.

6. A fluid regulator including a housing having a fluid passage therethrough, an upwardly opening valve in said passage, an upper valve chamber and a lower valve chamber, means in said lower valve chamber tending to unseat said valve, said valve being held in its seat by fluid pressure on the upstream side thereof, a leak from the said upstream side to said lower valve chamber, a cylinder above said valve, a piston in said cylinder, means connecting the lower valve chamber with said cylinder and means on said piston, and normally spaced above and out of contact with said valve, to close said valve.

HAROLD W. FLETCHER.